(12) United States Patent
Willis et al.

(10) Patent No.: US 10,477,600 B1
(45) Date of Patent: Nov. 12, 2019

(54) TRANSPORTATION PLATFORM TRACKING SYSTEM AND METHOD FOR CONFIGURING A TRANSPORTATION TRACKING SYSTEM

(71) Applicant: BlackBerry Limited, Waterloo (CA)

(72) Inventors: Edward Snow Willis, Kanata (CA); Sameh Ayoub, Kanata (CA); Christopher Stubbs, Kanata (CA); David Kerr, Kanata (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 16/028,885

(22) Filed: Jul. 6, 2018

(51) Int. Cl.
*H04W 76/11* (2018.01)
*H04W 4/029* (2018.01)

(52) U.S. Cl.
CPC ............ *H04W 76/11* (2018.02); *H04W 4/029* (2018.02)

(58) Field of Classification Search
CPC .............................. H04W 4/029; H04W 76/10
See application file for complete search history.

(56) References Cited

U.S. PATENT DOCUMENTS

| | | | |
|---|---|---|---|
| 2011/0081860 A1 | 4/2011 | Brown et al. | |
| 2015/0281116 A1* | 10/2015 | Ko | H04L 63/06 713/171 |
| 2016/0044719 A1* | 2/2016 | Sidhu | H04W 76/10 370/329 |
| 2016/0098870 A1* | 4/2016 | Bergerhoff | G07C 9/00007 340/5.61 |
| 2016/0379165 A1* | 12/2016 | Moakley | H04W 4/046 705/333 |
| 2017/0171314 A1* | 6/2017 | Britt | H04L 63/0428 |
| 2018/0176760 A1* | 6/2018 | Brandt | H04W 8/005 |

* cited by examiner

*Primary Examiner* — Wen W Huang
(74) *Attorney, Agent, or Firm* — Gowling WLG (Canada) LLP (57) ABSTRACT

A hub device that monitors characteristics of a transportation platform, such as a tractor trailer used for transporting goods, may establish connections with a plurality of external sensors. In order to simplify the pairing process between the hub devices and the external sensors, the hub device may be receiving IDs of the sensors to pair to from a remote server. A technician may physically scan tags, for example a barcode or an NFC tag, of the sensors and hub device, which are then transmitted to the remote server in order to identify which hub and sensors should be paired.

16 Claims, 5 Drawing Sheets

TRANSPORTATION PLATFORM TRACKING SYSTEM AND METHOD FOR CONFIGURING A TRANSPORTATION TRACKING SYSTEM

TECHNICAL FIELD

The current disclosure relates to a tracking device and in particular to configuring communications between the tracking device and external sensors.

BACKGROUND

Tracking devices can be used in industry in order to track the location of assets. The tracking devices may be associated with the asset and report the position of the tracking device, and so the asset. For example, in package delivery, a package may be associated with a delivery vehicle that has a tracking device on it. A tracking device may additionally or alternatively track details other than the location using one or more sensors. For example, a tracking device may provide details about a delivery vehicle such as the location, humidity, temperature, pressure, loading status of the cargo such as a percentage of capacity, door open/closed status as well as other possible information.

In addition to the various internal sensors that a tracking device may have, it can be desirable to connect additional sensors to the tracking device. For example, additional remote temperature sensors could be connected to the tracking device to sense the temperature at a number of different locations within the delivery vehicle. Such external sensors can be connected to the tracking device using short range communication radios, such a Bluetooth, ZigBee, Z-Wave or short range radio frequency protocols. While pairing of a single sensor to a single tracking device may be a relatively simple process, it is not well suited to an environment in which a number of sensors and tracking devices are present in close proximity as it is difficult to determine the appropriate sensor to pair with a particular tracking device. Further, often times the personnel responsible for pairing such devices are mechanics or drivers and not well suited for pairing the devices.

An additional, alternative and/or improved system for pairing external sensors with a device would be desirable.

BRIEF DESCRIPTION OF THE DRAWINGS

Features, aspects and advantages of the present disclosure will become better understood with regard to the following description and accompanying drawings in which.

DETAILED DESCRIPTION

In accordance with the present disclosure there is provided a system for establishing connections between devices, the system comprising: one or more peripheral devices physically associated with a transportation platform, each peripheral device associated with a unique peripheral identifier (ID) and comprising: a short range radio frequency (RF) communication radio; a processor for executing instructions; and a memory storing instructions, which when executed configure the peripheral device to: establish a connection with a device over the short range RF communication radio; a hub device physically associated with the transportation platform associated with a unique identifier (uID) and comprising: a short range RF communication radio; a long range RF communication radio; a processor for executing instructions; and a memory storing instructions, which when executed configure the hub device to: receive, over the long range RF communication radio, a message containing the one or more peripheral IDs associated with the one or more peripheral devices physically associated with the transportation; and attempt to establish one or more connections with one or more peripherals associated with the received one or more peripheral IDs using the short range RF communication radio to provide one or more communication channels over which peripheral data is received; and a mobile communication device comprising: a long range RF communication radio; an ID scanner; a processor for executing instructions; and a memory storing instructions, which when executed configure the mobile communication device to: capture, with the ID scanner, the one or more peripheral IDs associated with one or more peripheral devices physically associated with the transportation platform; capture, with the ID scanner, the uID associated with the hub device physically associated with the transportation platform; and transmit using the long range RF communication radio a registration message including the captured one or more peripheral IDs and the captured uID; and a server coupled to a communication network and comprising: a processor for executing instructions; and a memory storing instructions, which when executed configure the server to: receiving the registration message transmitted from the mobile communication device; determine communication details for communicating with the hub device associated with the uID received in the registration message; and transmitting a pairing request to the hub device in accordance with the determined communication details, the pairing request including the one or more peripheral IDs.

In a further embodiment of the system, the executed instructions of at least one of the one or more peripheral devices configure the at least one peripheral device to intermittently broadcast the unique peripheral identifier.

In a further embodiment of the system, the executed instructions of at least one of the one or more peripheral devices configure the at least one peripheral device to transmit data to the hub device over the established one or more connections.

In a further embodiment of the system, the executed instructions of hub device configure the hub device to transmit to the server a result of the attempt to establish the one or more connections with the one or more peripherals, and wherein the executed instructions of server configure the server to transmit the result to the mobile communication device.

In a further embodiment of the system, the executed instructions of hub device configure the hub device to: receive monitoring data from the one or more peripheral devices over the established one or more connections; and transmit monitoring data to a monitoring server.

In a further embodiment of the system, the ID scanner of the mobile communication device comprises one or more of an optical reader, an image capture device, a near field communication (NFC) tag reader, and a short range radio frequency identification (RFID) tag reader.

In accordance with the present disclosure there is further provided a hub device for physical association with a transport platform, the hub device associated with a unique identifier (uID) and comprising: a short range RF communication radio; a long range RF communication radio; a processor for executing instructions; and a memory storing instructions, which when executed configure the hub device to: receive, over the long range RF communication radio, a message containing one or more peripheral IDs associated with one or more peripheral devices physically associated with the transport platform and capable of communicating with the hub device using the short range RF communication radio; and attempt to establish one or more connections with one or more peripherals associated with the received one or more peripheral IDs using the short range RF communication radio to provide one or more communication channels over which peripheral data is received.

In a further embodiment of the hub device, the executed instructions further configure the hub device to transmit, over the long range RF communication radio, a result of the attempt to establish the one or more connections with the one or more peripherals.

In a further embodiment of the hub device, the result of the attempt to establish the one or more connections with the one or more peripherals is transmitted if the attempt to establish one or more connections fails.

In a further embodiment, the hub device further comprises one or more internal sensors for monitoring an environment of the hub device.

In a further embodiment of the hub device, the executed instructions further configure the hub device to receive monitoring data from the one or more peripheral devices over the established one or more connections.

In a further embodiment of the hub device, the executed instructions further configure the hub device to transmit monitoring data from one or more of the internal sensors and the one or more peripheral devices using the long range RF radio.

In a further embodiment, the hub device further comprises a barcode or optical tag encoding the uID on an exterior of the hub device.

In a further embodiment, the hub device further comprises a near-field communication (NFC) tag or a short range radio frequency identification (RFID) tag encoding the uID.

In accordance with the present disclosure there is further provided a method of establishing connections between a hub device and one or more peripheral devices, the hub device associated with a unique identifier (uID), each of the one or more peripheral devices associated with a respective peripheral identifier (ID), and each of the hub device and one or more peripheral devices physically associated with a transportation platform, the method comprising: capturing with an ID scanner of a mobile device the uID of the hub device and the peripheral IDs of the one or more peripheral devices; transmitting the captured uID and one or more peripheral IDs from the mobile device to a server; receiving, at the server, the transmitted uID and one or more peripheral IDs; determining, at the server, hub communication details previously stored in association with the received uID; transmitting, using the determined hub communication details, from the server to the hub device the one or more peripheral IDs; receiving at the hub device the one or more peripheral IDs; and attempting to establish a connection with peripherals associated with the one or more peripheral IDs.

In a further embodiment, the method further comprises: transmitting from the hub device to the server a result of the attempt to establish the one or more connections with the one or more peripheral devices; and transmitting the result from the server to the mobile device.

In a further embodiment, the method further comprises: receiving, at the hub device, monitoring data from the one or more peripheral devices over the established one or more connections; and transmitting, from the hub, monitoring data to a monitoring server.

In a further embodiment of the method, the ID scanner for capturing the uID and one or more peripheral IDs comprises one or more of an optical reader, an image capture device, a near field communication (NFC) tag reader, and a short range radio frequency identification (RFID) tag reader.

In accordance with the present disclosure there is further provided a computer readable memory, having stored thereon computer executable instructions, which when executed by a processor of a hub device configure the hub device to: receive, over a long range RF communication radio of the hub device, a message containing one or more peripheral IDs associated with one or more peripheral devices physically associated with a transport platform and capable of communicating with the hub device using a short range RF communication radio of the hub device; and attempt to establish one or more connections with one or more peripherals associated with the received one or more peripheral IDs using the short range RF communication radio to provide one or more communication channels over which peripheral data is received.

In accordance with the present disclosure there is further provided a computer readable memory, having stored thereon computer executable instructions, portions of which when executed by processors of a mobile device, a hub device and a server configure the mobile device, hub device and server to: capture with an ID scanner of a mobile device the uID of the hub device and peripheral IDs of one or more peripheral devices; transmit the captured uID and one or more peripheral IDs from the mobile device to a server; receive at the server the transmitted uID and one or more peripheral IDs; determine at the server hub communication details previously stored in association with the received uID; transmit, using the determined hub communication details, from the server to the hub device the one or more peripheral IDs; receiving at the hub device the one or more peripheral IDs; and attempt to establish a connection with peripherals associated with the one or more peripheral IDs.

A hub device capable of receiving, over a long range radio, identifiers of peripheral devices to establish connections with and then establishing connections with the peripheral devices may be useful in various applications. While pairing, for example over Bluetooth, a peripheral device with a hub is a known and simple process in numerous environments, the typical pairing process may not be well suited for all applications. For example, in the transportation industry, the hub device may be used to track information related to a tractor trailer, and may be paired with additional peripheral devices, such as sensors, on the tractor trailer. However, when the pairing process is performed, there may be numerous other peripheral devices in the vicinity that are physically associated with different tractor trailers and so should not be paired with the particular hub device. Previous hub devices have detected broadcast signals of peripheral devices in the vicinity, and then connected to selected peripherals from among all of the detected peripherals.

Selecting the appropriate peripheral devices for pairing can be difficult. A hub device capable of receiving over a long range radio the IDs of the peripheral devices to establish a connection with eliminates the need to select from among all of the detected peripheral devices those to connect to. The IDs of peripheral devices to connect to may be communicated to the hub devices from a pairing server, that may either have the pairing information stored, or may receive the pairing information from a mobile device. The mobile device may be used to physically identify, for example by scanning a an optical, machine-readable, representation of data, such as a barcode or QR code (referred to further below simply as barcode for brevity), or by 'tapping' a near-field communication (NFC) tag or short-range radio frequency identification (RFID) tag, the IDs of the peripheral devices as well as the ID of the hub that should be connected. For example, in use, a mechanic may install new temperature sensors throughout a trailer which should be connected to a hub device. The mechanic may use their mobile device that has an appropriate application running on it, to capture, by scanning of barcodes, the IDs of the new sensors and the hub. The IDs can be communicated from the mobile device to the pairing server, which can then communicate the sensor IDs to the appropriate hub, causing the hub to establish connections with each of the sensors.

Figure 1:
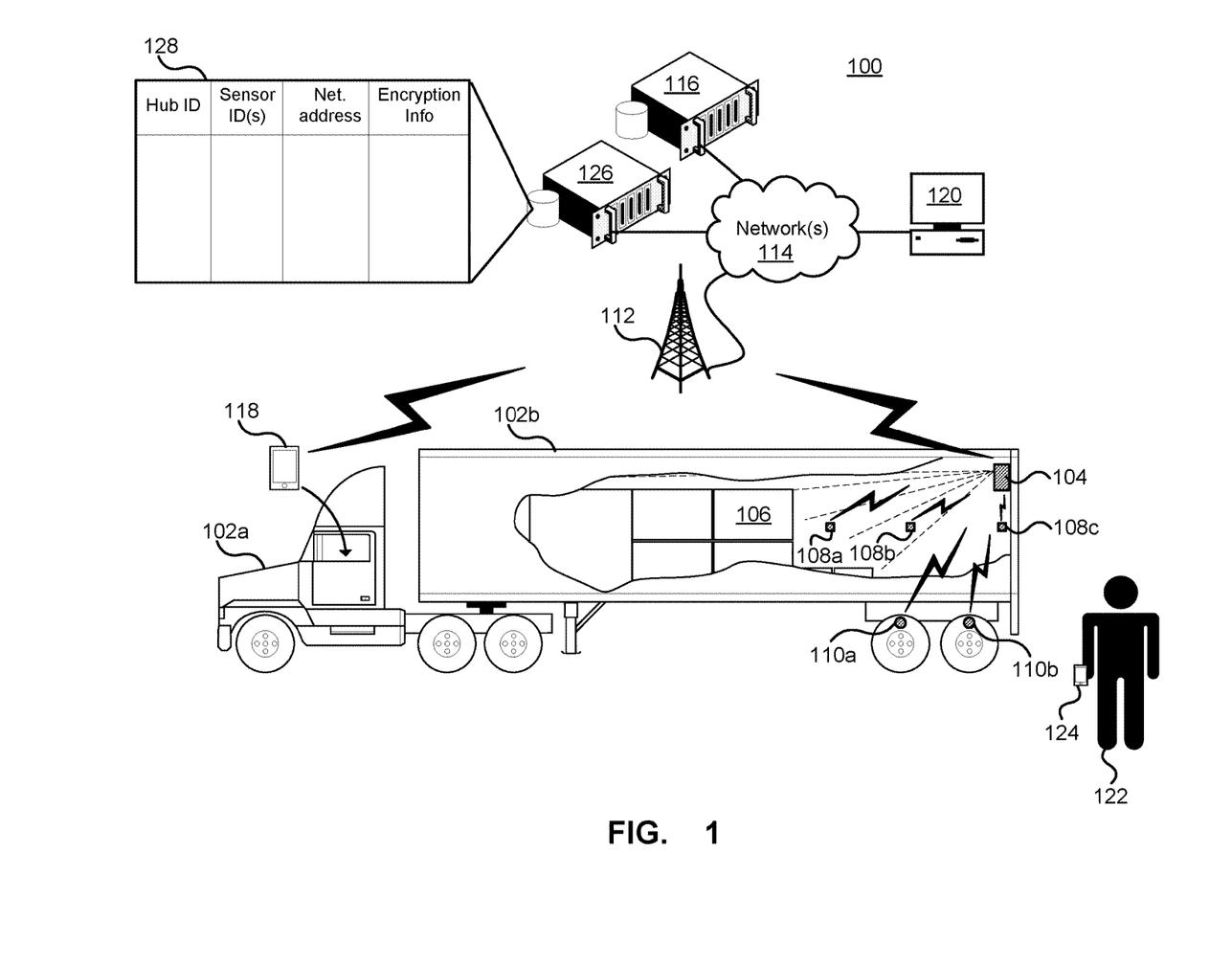
FIG. 1 depicts a system for pairing external sensors to a hub in a transportation environment.

FIG. 1 depicts a system for pairing external sensors to a hub in a transportation environment. The system 100 is described with particular reference to a transport truck 102a and trailer 102b for clarity; however, it will be apparent that the same or similar system 100 may be used in other environments. The system 100 comprises a hub device 104 that is physically associated with the trailer 102b. The hub 104 may be secured to a portion of the trailer 102b that allows the hub to monitor conditions within the interior of the trailer 102b. The hub 104 may include a number of internal sensors for monitoring the interior of the trailer. The internal sensors may include, for example temperature sensors, humidity sensors, light sensors, imaging sensors, microphones, accelerometers, gyroscopes and/or GPS receivers. The sensors can monitor the state of the trailer, such as the temperature as well as the location of the load 106. The hub 104 may include a long range radio frequency (RF) radio, such as a cellular 3G, 4G, 5G, etc. radio. The hub 104 may include an externally mounted antenna (not shown) for the radio in order to improve reception of RF signals. The hub 104 monitors and communicates status information to a remote location.

It may be desirable to connect additional sensors to the hub 104 to improve the monitoring abilities of the hub, or to add new monitoring abilities. For example, a number of external temperature sensors 108a, 108b, 108c (referred to collectively as temperature sensors 108 for brevity) may be placed throughout the trailer 102b in order to provide more precise temperature measurements within the trailer 102b. Similarly, tire pressure sensors 110a, 110b (referred to collectively as tire pressure sensors 110 for brevity) may be connected to the trailer tires. The hub 104 may establish a wireless connection with each of the temperature sensors 108 and the tire pressure sensors 110 in order to provide communication channels to periodically receive the monitored data over. The wireless connection can be established using a short range communication RF radio such as Bluetooth™, ZigBee™, and Z-Wave™.

The hub 104 may communicate data, including for example monitored sensor data from both internal and external sensors as well as notifications or processed information from the hub 104, using a cellular infrastructure 112 and network infrastructure 114 to a monitoring server 116. The monitoring server 116 may provide a back-end server for monitoring data from multiple hubs. In a basic implementation, the monitoring server may be provided by a web server, such as Apache™ or NGINX™, that receives data from hubs using an HTTP POST request and stores the received data to a file. Further functionality may be provided, for example by storing received data in a database or similar technology. The monitored data may also be processed to identify possible issues or events. For example, temperatures may be processed to ensure the fall within a defined temperature range. Processing the monitored data may result in a notification being raised and communicated to an appropriate location. For example, a high temperature alert may be communicated to a mobile device 118 in the tractor 102a, such as an in-cabin display or a mobile phone of the driver. Additionally or alternatively the notifications may be sent to an administration terminal 120. It will be appreciated that various monitoring and data processing functionality may be provided to meet the particular requirements of a given application.

Regardless of how the monitored data from the hub is processed, the hub 104 must be connected to the different sensors on the same physical trailer 102b as the hub 104 in order to receive the monitored data from the sensors 108, 110. In order to simplify the process for establishing the connection, either when new sensors are added, or when existing sensors or the hub is replaced, a technician 122, who may be a mechanic or drive for example, may use a mobile device 124, such as a cellular phone, running an application that allows the technician 122 to capture the IDs of the sensors and hub. Each of the sensors and hub may be associated with a unique ID that can be captured by interacting with the sensor or hub. For example, the sensors and hub may have their IDs encoded in a barcode that can be scanned using a camera of the technician's 122 mobile device 124. Additionally or alternatively, the IDs may be captured using near-field communication (NFC) tags by 'tapping' the technician's mobile device 124 on the tag. The mobile device 124 communicates the IDs over the cellular infrastructure 112 and the network infrastructure 114 to a pairing server 126. Although depicted as being provided by separate hardware from the monitoring server 116, the two servers may be provided on the same hardware. The pairing server 126 receives the IDs of the sensors and hub to be connected and instructs the hub, using the cellular infrastructure, to establish a connection with the identified sensors. The mobile device 124, or more particularly the application running on the mobile device, may communicate the captured IDs to the pairing server as they are captured, in which case the application may provide an user interface object, such as a button, to communicate to the pairing server that all IDs have been captured. Additionally or alternatively, the application on the mobile device may temporarily store the IDs until all of the IDs have been captured and transmit them in a single message to the pairing server.

In addition to providing a user interface for capturing IDs of the hub and sensors to be paired, the application on the mobile device may also allow additional information to be specified for the sensors and hub. For example, the type of sensor, if not identifiable by its unique identifier, may be input by the technician. Further, the location of the sensors may be specified. The mobile application may provide a user interface for allowing the technician 122 to specify the location of sensors, either as a text box, a selection from a set of locations, or by specifying the location on an image.

If additional information is associated with one or more sensor IDs, the additional information may be communicated to the pairing server 126 along with the sensor IDs. Various ways of transmitting both the additional information and sensor and hub IDs are possible. The application on the mobile device can capture IDs of the sensors and the hub that are all physically associated with the same trailer and then communicate those IDs to the pairing server in order to cause the hub to connect to the sensors. The mobile device application may also receive feedback information from the pairing server, for example providing feedback on the pairing success and any error messages, if provided to the pairing server from the hub. The feedback may, for example, indicate that a particular sensor ID was not detected by the hub and so was not connected. The technician may use the feedback information to diagnose and possibly address problems. For example, if a sensor ID is not detected by the hub, the technician may check to ensure that the sensor is powered on.

In addition to providing an interface for pairing one or more sensors with a hub, the mobile device may provide an interface for replacing an existing sensor with a new sensor, for example if replacing a broken sensor. The mobile device may provide an interface for capturing the ID of the existing sensor and the ID of the new sensor, which can be communicated to the pairing server. The pairing server may determine the hub ID currently associated with the existing sensor ID and instruct the hub to disconnect from the existing sensor and connect to the new sensor.

The pairing server 126 may receive an indication of a hub ID and one or more sensor IDs from the mobile device 124. The hub and sensor IDs may be received in a single message, or may be received in multiple messages. If multiple messages are provided, the last message should include an indication that there are no further IDs. Once the IDs are received the pairing server 126 may identify the hub ID, either based on received data associated with the ID such as a tag indicating that the ID is a hub ID, based on stored data associated with the ID, or based on the format of the ID matching an expected hub ID format. Once the hub ID is identified, it is used to determine communication details for communicating with the particular hub. For example, the communication details may include a network address, such as an Internet Protocol (IP) address, as well as other details such as encryption information, communication protocols, ports, etc. The information may be stored in a pairing or hub record or other storage structure, depicted schematically by pairing table 128. The pairing server 126 may use the communication details to send pairing instructions to the hub. The pairing instructions may include the sensor IDs received from the mobile device. Upon receiving the pairing instructions over the cellular network infrastructure, the hub attempts to establish a connection with each of the identified sensors. The hub may provide feedback information to the pairing server regarding the results of the pairing attempts with each of the sensors. For example, the hub can provide an indication of whether the pairing was successful or not as well as any error details, for each of the sensors. Alternatively, the hub may only communicate errors or unsuccessful pairing attempts to the pairing server. The pairing server 126 may store the paired sensor IDs in the pairing table 128.

The pairing server 126 may also receive messages from the mobile device of the technician 122 indicating that a sensor should be replaced. The pairing server can identify the current sensor ID and then determine the hub ID currently associated with the sensor ID. The determination may be used by, for example, by searching the pairing table 128, or other storage structure, for a matching sensor ID and then determining the hub ID it is associated with. The pairing server may then send a message to the hub indicating instructing the hub to disconnect the existing sensor and establish a connection with the new sensor. If the replacement pairing is successful, the pairing server 126 may update to pairing table 128 to reflect the new sensor ID being paired with the hub and remove the old sensor ID.

Figure 2A:
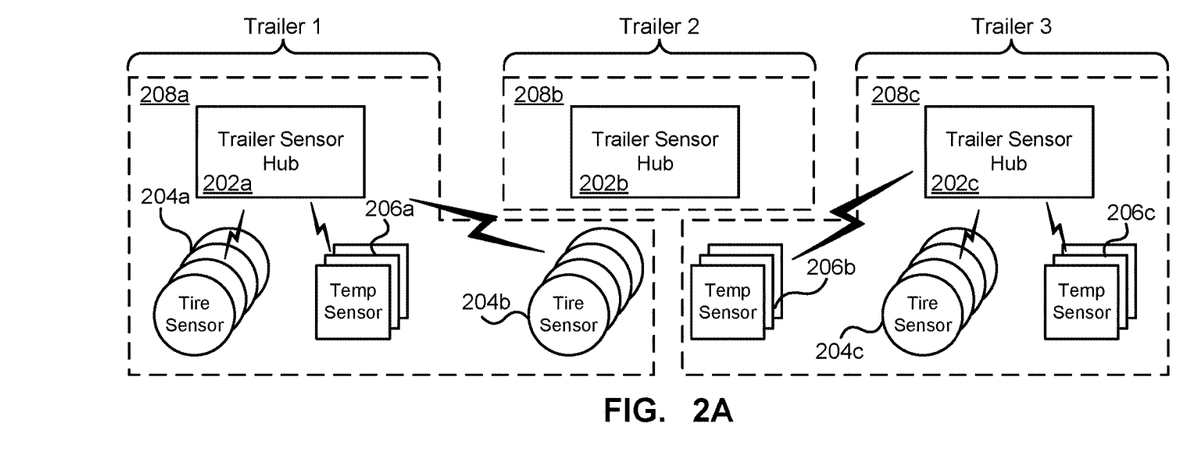
FIG. 2A depicts schematically an incorrect pairing of external sensors with hubs in a transportation environment.

FIG. 2A depicts schematically an incorrect pairing of external sensors with hubs in a transportation environment. In the scenario depicted in FIG. 2A, the sensors and hubs do not include bar codes, NFC tags or similar means for identifying the IDs, and as such it is not possible to utilize the system described above for correctly pairing sensors with hubs. As depicted, there are three different trailers, each physically associated with a hub and a number of sensors. As depicted trailer 1 is physically associated with hub 202a, tire sensors 204a and temperature sensors 206a. Trailer 2 is physically associated with hub 202b, tire sensors 204b and temperature sensors 206b, and trailer 3 is physically associated with hub 202c, tire sensors 204c and temperature sensors 206c. Assuming the trailers are in close proximity to each other, the hubs 202a-c may detect not only the sensors on the same trailer as the hub, but also sensors on adjacent trailers. As a result, errors may be made in selecting sensors to connect to the hubs. This is depicted schematically in FIG. 2A with the sensors connected with respective hubs depicted by dashed lines 208a, 208b, 208c. As depicted, the hub 202a that is physically associated with trailer 1 is not only correctly paired with sensors 204a and 206a that are on, or at least physically associated with, the same trailer, but hub 202a is also incorrectly paired with tire sensors 204b that are physically associated with trailer 2. Similarly the hub 202c that is physically associated with trailer 3 is not only correctly paired with sensors 204c and 206c that are on, or at least physically associated with, the same trailer, but hub 202c is also incorrectly paired with temperature sensors 206b that are physically associated with trailer 2. The hub 202b is not paired to any sensors, even though trailer 2 that the hub is physically associated with has both tire sensors 204b and temperature sensors 206b.

Figure 2B:
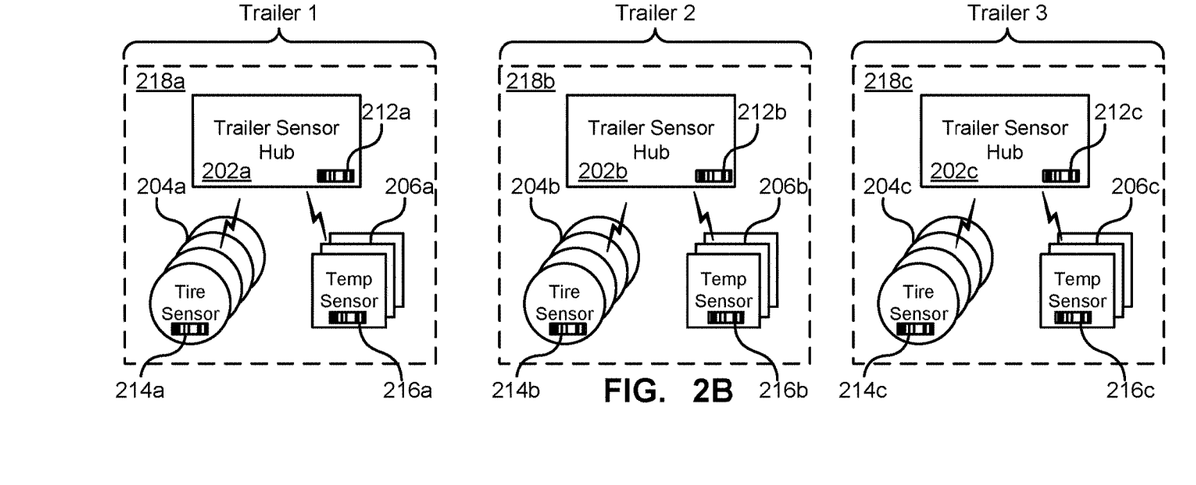
FIG. 2B depicts schematically a correct pairing of external sensors with hubs in a transportation environment.

FIG. 2B depicts schematically a correct pairing of external sensors with hubs in a transportation environment. The trailer arrangement is the same as depicted in FIG. 2A, that is trailer 1 is associated with hub 202a and sensors 204a, 206a, trailer 2 is associated with hub 202b and sensors 204b, 206b, and trailer 3 is associated with hub 202c and sensors 204c, 206c. However, in contrast to FIG. 2A, each of the hubs 202a-c are associated with respective barcodes 212a-c, each of the tire sensors 204a-c are associated with respective barcodes 214a-c and each of the temperature sensors 206a-c are associated with respective barcodes 216a-c. Since each of the hubs and sensors are associated with respective barcodes, the above described system can be used to identify the hub and sensors on a single trailer using a mobile device, and then causing the hubs to establish connections with the appropriate sensors. As depicted by box 218a, hub 202a is paired with tire sensors 204a and temperature sensor 206a. As depicted by box 218b, hub 202b is paired with tire sensors 204b and temperature sensor 206b, and as depicted by box 218c, hub 202c is paired with tire sensors 204c and temperature sensor 206c.

Figure 3:
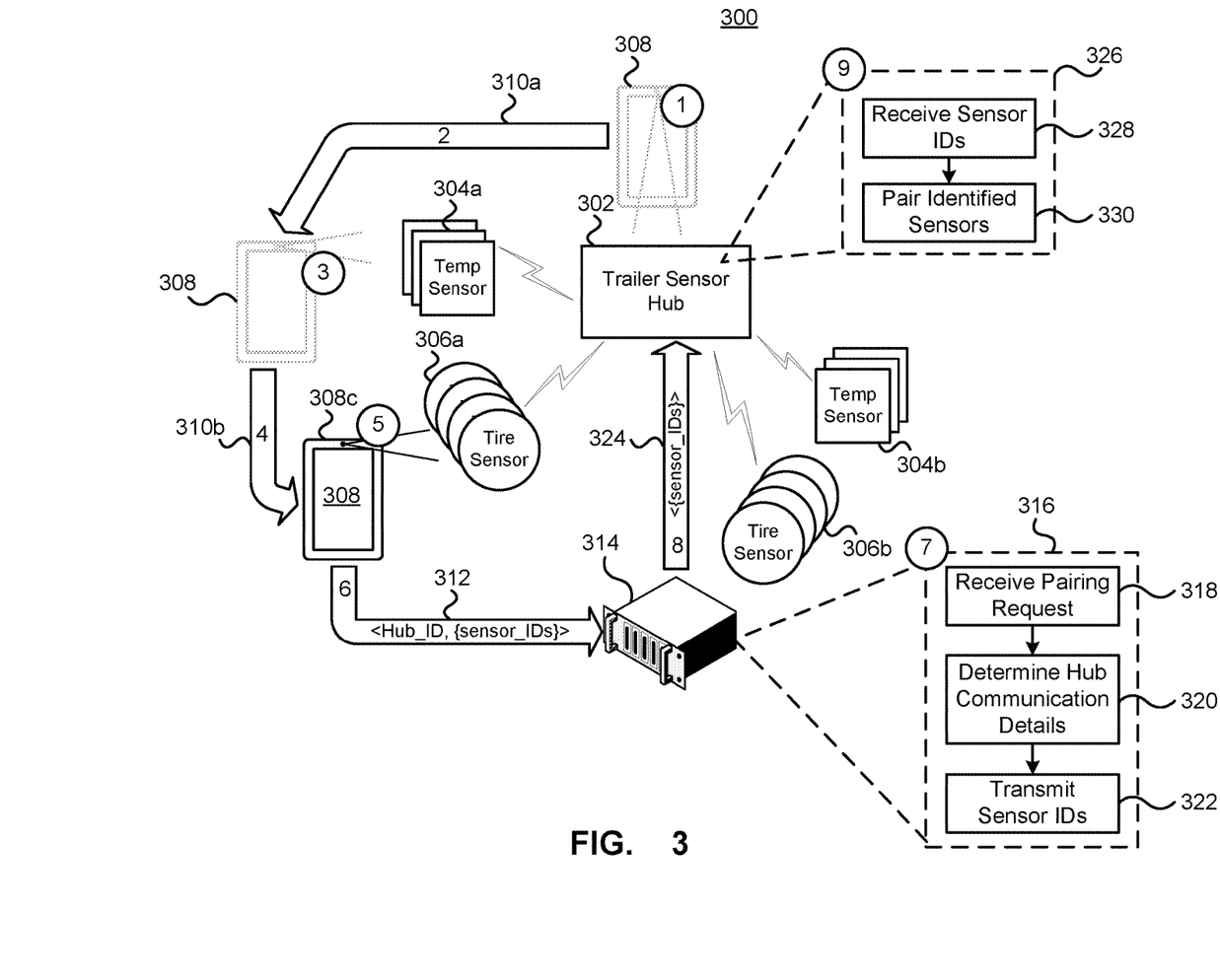
FIG. 3 depicts schematically a process for pairing external sensors with a hub.

FIG. 3 depicts schematically a process for pairing external sensors with a hub. The process 300 is depicted with respect to pairing a hub 302 with a set of temperature sensors 304a and tire sensors 306a. The hub 300 is able to detect the sensor IDs broadcast not only by temperature sensors 304a and tire sensors 306a, which are the sensors to be paired to the hub, but also additional temperature sensors 304b and tire sensors 306b. In the case of a tractor trailer, the sensors to be paired with the hub may be all sensors that are physically associated with the same trailer as the hub.

The process 300 involves moving a mobile device 308 to capture the barcodes, or other objects encoding the IDs, of the sensors 304a, 306a and hub 302, transmitting them to a pairing server 314 that processes them and sends a pairing message to the hub 302, which causes the hub 302 to pair with the appropriate sensors 304a, 306a. The mobile device 308 may first capture the ID of the desired hub by, for example scanning a barcode of the hub. The mobile device 308 then may be moved, depicted by large arrow 310a, to capture IDs of one or more sensors to be paired to the hub, such as the temperature sensors 304a, before again moving as depicted by large arrow 310b to capture the IDs of further sensors such as tire sensors 306a.

Capturing IDs is depicted graphically by using a camera to scan a barcode (not shown), however other objects that can encode the ID such as an NFC tag Although depicted as capturing the IDs of all of the temperature sensors 304a and then all of the tire sensors 306a, it should be apparent that the sensor IDs can be captured in any particular order. Similarly, the hub ID does not need to be captured first. Further, different IDs, including the sensor IDs and hub IDs may be captured in other ways, including for example by manually entering the IDs. Once the hub ID and the sensor IDs have been captured by the mobile device 308 they may be communicated, depicted as big arrow 312, using the cellular and network infrastructure to a pairing server 314. As depicted, the hub and sensor IDs may be transmitted in a single message to the server 314. Alternatively, one or more messages may be used to transmit all of the captured IDs to the server 314.

The server 314 is configured to perform various functionality 316. The server may receive a pairing request (318). The pairing request includes a hub ID and one or more sensor IDs that should be paired to the hub. The pairing request may be received at the server 314 in one or more messages transmitted from a mobile device over a cellular and network infrastructure. The structure or format of the message, or messages, can provide an indication of what ID is the hub ID and what IDs are sensor IDs. For example, the first ID in the message may be assumed to be the hub ID and the other IDs in the message may be assumed to be sensor IDs. Other message formats may be used. Alternatively, the hub ID and sensor IDs may be distinguished based on the format of the IDs themselves, using additional information transmitted in the message associated with the IDs, or using stored information accessible by the server 314. Once the request is received, and the hub ID identified from within the message, communication details for the hub can be determined (320). The communication details can be determined using a lookup for a record based on the hub ID. The communication details may include a network address, such as an IP address. Other possible information that may be part of the communication details includes, for example, communication ports, communication protocols, encryption protocols, encryption keys, digital certificates, access tokens, user names and passwords, and/or other information for establishing a communication channel between the hub and the server. Once the communication details are determined, the sensor IDs are transmitted to the hub (322) over the communication channel, depicted schematically by arrow 324, providing instructions to the hub to connect to the identified sensors. The hub is configured to perform various functionality 326. The hub receives the sensor IDs (326) over the cellular infrastructure, and then pairs the hub with the identified sensors (330) to establish a connection with the sensors.

Figure 4:
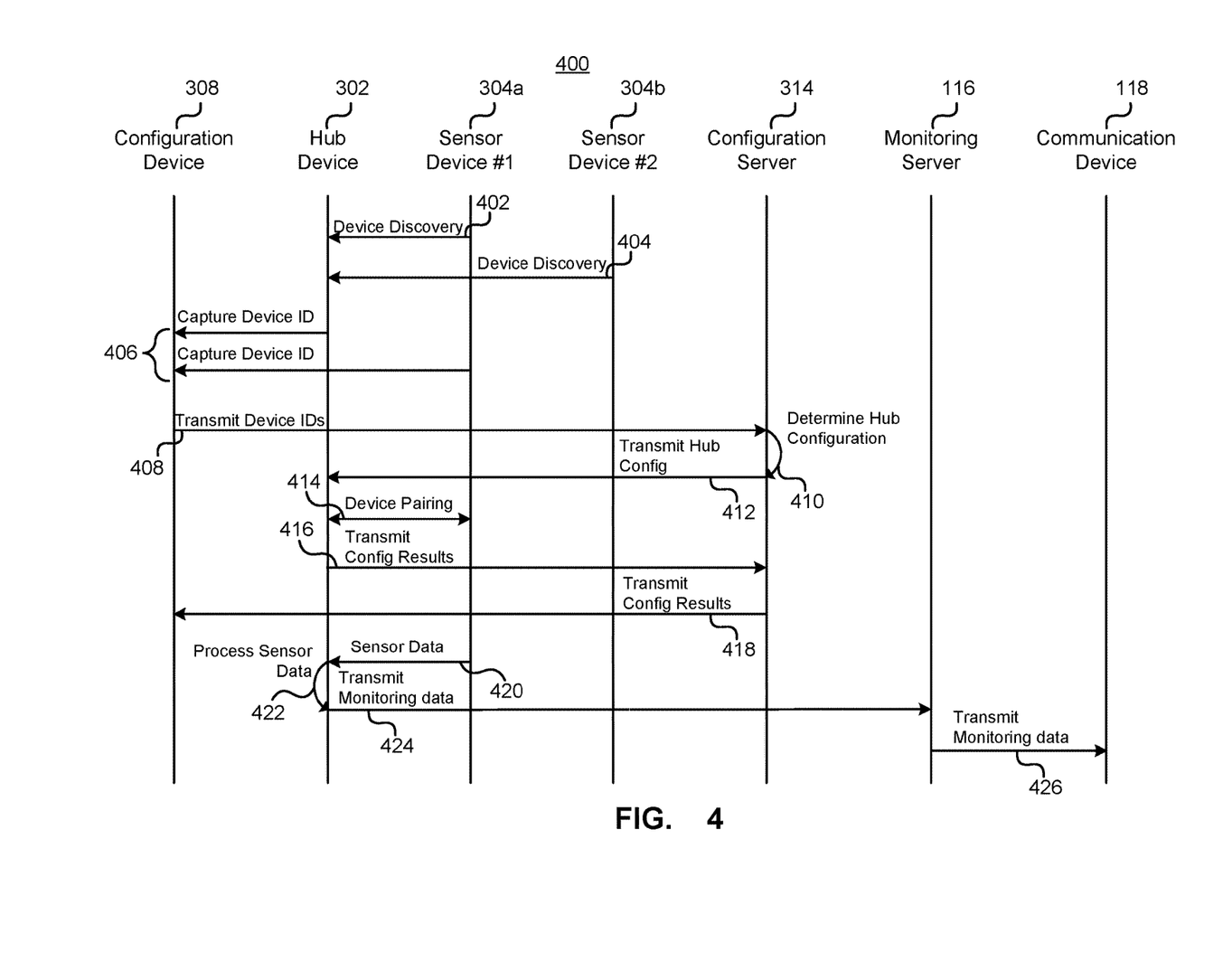
FIG. 4 depicts a process flow of pairing external sensors with a hub.

FIG. 4 depicts a process flow of pairing external sensors with a hub. The process flow 400 depicts the interaction between various components of the system depicted in FIGS. 1 and 3, including a configuration mobile device 308, a hub device 302, a first sensor 304a, a second sensor 304b, a configuration server 314, a monitoring server 116, and a communication device 118. The process flow 400 begins with the sensor devices 304a, 304b broadcasting their device discovery information (402, 404) that is detected by the hub device 302. In previous pairing processes, the hub would select which of the detected devices to connect to, or may connect to both sensor devices 304a, 304b. However, in the current system, a configuration device 308 is used to capture the device IDs (406) of the devices to be paired together, which is assumed to be only the hub device 302 and the sensor device 304a. As depicted, the device IDs of the hub 302 and the first sensor 304a are captured. The IDs may be captured using a scanner or camera of the configuration device to read a bar code or similar optical encoding or may use a NFC reader to read an NFC tag. The barcodes or NFC tags may be printed or formed on the devices, or the barcodes or tags may be placed in the vicinity of the devices. Once the device IDs are captured, the IDs, including the hub ID and sensor ID, are transmitted to a configuration server 314 (408). The configuration server determines the hub configuration (410), including determining communication details for the hub as well as determining what sensors need to be paired. The hub configuration, and in particular the sensor IDs to be paired, are transmitted to the hub (412). Once the hub configuration is received at the hub, the appropriate sensors, namely those that were scanned, are paired (414) with the hub. The pairing process may use a standard pairing operation, such as Bluetooth, or other pairing process as appropriate. Once the pairing process is complete the hub may communicate the configuration results (416) back to configuration server 314. The configuration server may then communicate the configuration results back to the configuration device 308 (418). If any of the sensors were not successfully paired, a technician may attempt to remedy the failed sensor pairings. Once paired, the sensor may communicate sensor data to the hub 302 (420). The hub may process the data (422), which may include logging, aggregating, or other data processing, and then transmit monitoring data back to a monitoring server 122 (424). The monitoring server may provide the monitoring data, or portions of the monitored data to a communication device 118 (426) such as a mobile device of a driver of the tractor trailer.

Figure 5:
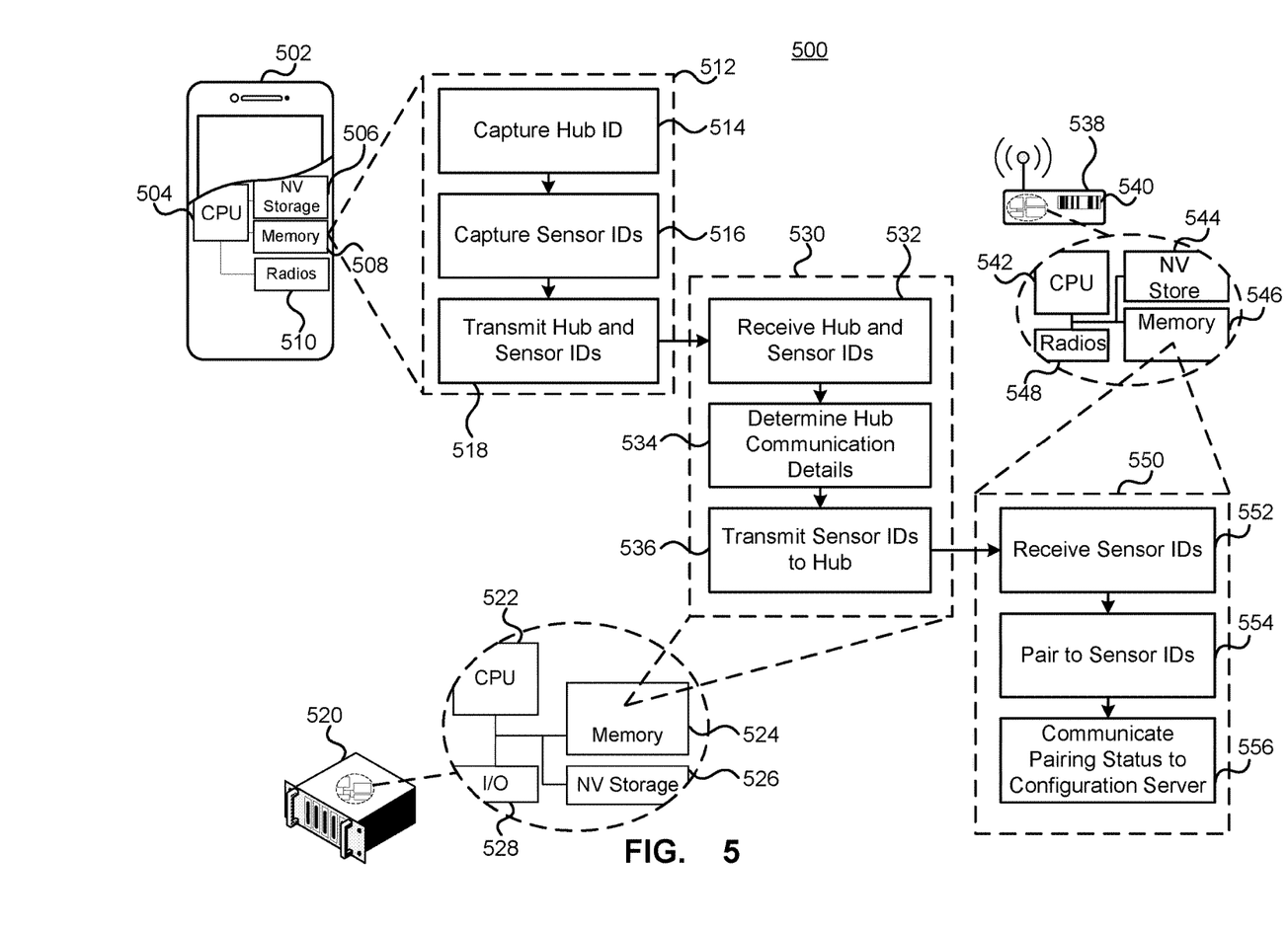
FIG. 5 depicts a method, and related components, for pairing external sensors with a hub.

FIG. 5 depicts a method, and related components, for pairing external sensors with a hub. A tracking system may include a plurality of sensors each having a unique ID that can be captured by an appropriate reader or sensor of a mobile device configured to capture the IDs, a hub that can establish a short range connection with the sensors, and a server that can receive IDs from the mobile device and cause the hub to establish the short range connections.

Although not depicted in FIG. 5, each of the sensors, or more broadly the peripheral devices has a unique ID, a short range RF communication radio, a processor for executing instructions, and a memory storing instructions. When the stored instructions are executed by the processor, the peripheral device is configured to establish a connection with a device over the short range RF communication radio. The sensor may also be configured to intermittently broadcast a unique peripheral identifier.

The mobile device 502 used for scanning sensor and hub IDs may be a smartphone that comprises a processor 504 for executing instructions, non-volatile (NV) storage 506 for permanent or semi-permanent storage of data and instructions, memory 508 for storing instructions and data and a plurality of radios 510. The radios 510 include both a short range radio for communicating with sensors as well as a long range radio for communicating with remote servers. The short range radios may be one or more of a Bluetooth radio, ZigBee radio, Z-Wave radio. The long range radios may be one or more of a 3G, 4G, or 5G cellular radio. The mobile device 502 may further comprise one or more devices for capturing IDs from devices, such as a camera for scanning barcodes, and/or an NFC reader.

The instructions stored in the memory 508 can be executed by the processor in order to configure the mobile device to perform a method 512 for use in configuring the hub. The method 512 comprises capturing a hub ID (514) and one or more sensor IDs (516). The hub and sensors associated with the captured IDs are all associated with the sane physical trailer, or similar transportation component. Once the IDs are captured, they are transmitted to a remote location (518) over the mobile device's long range communication radio. The remote location is a configuration, or pairing, server 520.

The configuration server comprises a processor 522 for executing instructions, non-volatile (NV) storage 526 for permanent or semi-permanent storage of data and instructions, memory 524 for storing instructions and data and one or more input/output (I/O) devices 528 such as network interface cards. When the instructions stored in the memory 524 are executed by the processor 522, they configure the server 520 to perform a method 530 for use in configuring a hub. The method 530 comprises receiving hub and sensor IDs (532) from the configuration device 502 and determining the communication details for communicating with the particular hub (534). The communication details may include, for example a network address, along with other possible information, for communicating with the hub over a cellular infrastructure. Once the communication details are determined, they are used to transmit the received sensor IDs to the hub (536).

The hub 538 may have a barcode 540 or other object, such as an NFC tag, for encoding the unique ID of the hub and allow the ID to be captured by the mobile device 502. The hub 538 comprises a processor 542 for executing instructions, non-volatile (NV) storage 544 for permanent or semi-permanent storage of data and instructions, memory 546 for storing instructions and data and a plurality of radios 548. The radios 548 include both a short range radio for communicating with sensors as well as a long range radio for communicating with remote servers. The short range radios may be one or more of a Bluetooth radio, ZigBee radio, Z-Wave radio. The long range radios may be one or more of a 3G, 4G, or 5G cellular radio.

When the instructions stored in the memory 546 are executed by the processor 542, they configure the hub 520 to perform a method 550. The method 550 comprises receiving the sensor IDs (552) over the long range radio and then pairing the hub to the sensors with the received sensor IDs. Once the pairing is completed, the status of the pairings with the different sensors can then be communicated back to the configuration server 520 (556).

The above has described a system, devices, and methods for configuring a hub to establish connections with particular sensors, even if additional sensors are in the communication range of the hub. The system, devices and methods have been described with particular reference to a transport trailer application. The system may be used in other transport related applications, in which a transportation platform is physically associated with a hub and one or more sensors, or more broadly peripheral devices. The transportation platform may be any transportation device that is susceptible to being tracked by a hub with additional sensors. The transportation platform may include for example a tractor trailer, including dry trailers and heated/refrigerated trailers as described, a delivery truck, a chassis or flatbed trailer, heavy equipment, agriculture equipment, municipal and public equipment include electronic road signage such as portable signs often used in construction, and other similar devices. Further, although the peripheral devices are described as being sensors, and in particular tire sensors and temperature sensors, a wide range of different sensors may be provided. The sensors may be able to sense characteristics of the environment, characteristics of assets or objects being transported, operational characteristics of the transportation equipment. Other types of sensors may also be used in the system.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. The techniques of various embodiments may be implemented using software, hardware and/or a combination of software and hardware other than the specific implementations described herein as illustrative examples.

Many of the above described methods or method steps can be implemented using machine executable instructions, such as software, included in a machine readable medium such as a memory device, e.g., RAM, floppy disk, etc. to configure a machine, e.g., general purpose computer with or without additional hardware, to implement all or portions of the above described methods. Accordingly, among other things, various embodiments are directed to a machine-readable medium e.g., a non-transitory computer readable medium, including machine executable instructions for causing a machine, e.g., processor and/or associated hardware, to perform one or more or all of the steps of the above-described method(s). Some embodiments are directed to a device including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device Various features in the present application relate to a technical problem of how to configure a hub to establish connections with a subset of a plurality of peripheral devices.

What is claimed is:

1. A system for establishing connections between devices, the system comprising:
one or more peripheral devices physically associated with a transportation platform, each peripheral device associated with a unique peripheral identifier (ID) and comprising:
a short range radio frequency (RF) communication radio;
a processor for executing instructions; and
a memory storing instructions, which when executed configure the peripheral device to:
establish a connection with a device over the short range RF communication radio;
a hub device physically associated with the transportation platform associated with a unique identifier (uID) and comprising:
one or more internal sensors for monitoring an environment of the transportation platform;
a short range RF communication radio;
a long range RF communication radio;
a processor for executing instructions coupled to the one or more internal sensors and communicating by the long range RF communication radio information from the one or more internal sensors and one or more peripheral devices when paired with the hub device; and
a memory storing instructions, which when executed configure the hub device to:
receive, over the long range RF communication radio, a message containing the one or more peripheral IDs associated with the one or more peripheral devices physically associated with the transportation; and
attempt to establish one or more connections with one or more peripherals associated with the received one or more peripheral IDs using the short range RF communication radio to provide one or more communication channels over which peripheral data is received; and
a mobile communication device comprising:
a long range RF communication radio;
an ID scanner;
a processor for executing instructions; and
a memory storing instructions, which when executed configure the mobile communication device to:
capture, with the ID scanner, the one or more peripheral IDs associated with one or more peripheral devices physically associated with the transportation platform;
capture, with the ID scanner, the uID associated with the hub device physically associated with the transportation platform; and
transmit to a remote server using the long range RF communication radio a registration message including the captured one or more peripheral IDs and the captured uID; and
wherein the remote server is coupled to a communication network and comprises:

a processor for executing instructions; and
a memory storing instructions, which when executed configure the server to:
receiving the registration message transmitted from the mobile communication device;
determine, using the uID received in the registration message, communication details for communicating with the hub device associated with the uID received in the registration message; and
transmitting a pairing request to the hub device in accordance with the determined communication details, the pairing request including the one or more peripheral IDs.

2. The system of claim 1, wherein the executed instructions of at least one of the one or more peripheral devices configure the at least one peripheral device to intermittently broadcast the unique peripheral identifier.

3. The system of claim 1, wherein the executed instructions of at least one of the one or more peripheral devices configure the at least one peripheral device to transmit data to the hub device over the established one or more connections.

4. The system of claim 1, wherein the executed instructions of hub device configure the hub device to transmit to the server a result of the attempt to establish the one or more connections with the one or more peripherals, and wherein the executed instructions of server configure the server to transmit the result to the mobile communication device.

5. The system of claim 1, wherein the executed instructions of hub device configure the hub device to:
receive monitoring data from the one or more peripheral devices over the established one or more connections; and
transmit monitoring data to a monitoring server.

6. The system of claim 1, wherein the ID scanner of the mobile communication device comprises one or more of an optical reader, an image capture device, a near field communication (NFC) tag reader, and a short range radio frequency identification (RFID) tag reader.

7. A hub device for physical association with a transportation platform, the hub device associated with a unique identifier (uID) and comprising:
one or more internal sensors for monitoring an environment of the transportation platform;
a short range RF communication radio;
a long range RF communication radio;
a processor coupled to the one or more internal sensors and communicating by the long range RF communication radio information from the one or more internal sensors and one or more peripheral devices when paired with the hub device; and
a memory storing instructions for execution by the processor, which when executed configure the hub device to:
receive, over the long range RF communication radio, a message containing one or more peripheral IDs associated with one or more peripheral devices physically associated with the transport platform and capable of communicating with the hub device using the short range RF communication radio;
attempt to establish one or more connections with one or more peripherals associated with the received one or more peripheral IDs using the short range RF communication radio to provide one or more communication channels over which peripheral data is received; and transmit, over the long range RF communication radio, a result of the attempt to establish the one or more connections with the one or more peripherals.

8. The hub device of claim 7, wherein the result of the attempt to establish the one or more connections with the one or more peripherals is transmitted if the attempt to establish one or more connections fails.

9. The hub device of claim 7, wherein the executed instructions further configure the hub device to receive monitoring data from the one or more peripheral devices over the established one or more connections.

10. The hub device of claim 9, wherein the executed instructions further configure the hub device to transmit monitoring data from one or more of the internal sensors and the one or more peripheral devices using the long range RF radio.

11. The hub device of claim 7, further comprising a barcode or optical tag encoding the uID on an exterior of the hub device.

12. The hub device of claim 7, further comprising a near-field communication (NFC) tag or a short range radio frequency identification (RFID) tag encoding the uID.

13. A method of establishing connections between a hub device physically associated with a transportation platform and one or more peripheral devices, the hub device comprising one or more internal sensors for monitoring an environment of the transportation platform, the hub associated with a unique identifier (uID), each of the one or more peripheral devices associated with a respective peripheral identifier (ID) and physically associated with the transportation platform, the method comprising:
  capturing with an ID scanner of a mobile device the uID of the hub device and the peripheral IDs of the one or more peripheral devices;
  transmitting the captured uID and one or more peripheral IDs from the mobile device to a remote server;
  receiving, at the remote server, the transmitted uID and one or more peripheral IDs;
  determining, at the server and using the received uID, hub communication details previously stored in association with the received uID;
  transmitting, using the determined hub communication details, from the server to the hub device the one or more peripheral IDs;
  receiving at the hub device the one or more peripheral IDs; and
  attempting to establish a connection with peripherals associated with the one or more peripheral IDs
  wherein the hub communicates by a long range RF communication radio of the hub information from the one or more internal sensors and one or more peripheral devices when paired with the hub device.

14. The method of claim 13, further comprising:
  transmitting from the hub device to the server a result of the attempt to establish the one or more connections with the one or more peripheral devices; and
  transmitting the result from the server to the mobile device.

15. The method of claim 13, further comprising:
  receiving, at the hub device, monitoring data from the one or more peripheral devices over the established one or more connections; and
  transmitting, from the hub, monitoring data to a monitoring server.

16. The method of claim 13, wherein the ID scanner for capturing the uID and one or more peripheral IDs comprises one or more of an optical reader, an image capture device, a near field communication (NFC) tag reader, and a short range radio frequency identification (RFID) tag reader.

* * * * *